Patented Oct. 27, 1925.

1,559,518

UNITED STATES PATENT OFFICE.

JOSEPH BRESLAUER, OF GENEVA, SWITZERLAND, AND GEORGES DARIER, OF BORDIGHERA, ITALY, ASSIGNORS TO SOCIÉTÉ D'ÉTUDES CHIMIQUES POUR L'INDUSTRIE, OF GENEVA, SWITZERLAND, A CORPORATION OF SWITZERLAND.

MANUFACTURE OF NITROGENIC AND PHOSPHATIC COMBINATIONS.

No Drawing. Original application filed September 18, 1920, Serial No. 411,074. Divided and this application filed May 29, 1925. Serial No. 33,837.

*To all whom it may concern:*

Be it known that we, JOSEPH BRESLAUER, a citizen of Switzerland, residing at Geneva, Switzerland, and GEORGES DARIER, a citizen of Switzerland, residing at Bordighera, in Italy, have invented certain new and useful Improvements in Manufacture of Nitrogenic and Phosphatic Combinations, of which the following is a specification.

Our present invention relates to a process of producing fertilizers and, more particularly, to a process of transforming crude cyanamid to substances which may be mixed with other fertilizing materials, such as soluble phosphates, in forming a complete fertilizer.

The present application is a division of co-pending application Serial No. 411,074, filed Sept. 18th, 1920. Crude calcium cyanamid possesses physical characteristics which render its application as a fertilizer unsatisfactory and difficult and has an alkalinity, due to the presence of lime or loosely combined calcium, which causes it to react with acid phosphates with which it may be mixed changing them into insoluble phosphates, and which therefore renders it difficult or impossible to combine the nitrogenic constituents of the raw cyanamid with soluble or acid phosphates in forming a complete fertilizer. These disadvantages and obstacles are overcome in the process described in the above application, from which the present application is divided, by transforming the raw cyanamid into free cyanamid and thence into urea or salts of urea which may be mixed directly with phosphates or other fertilizing materials.

Our present invention relates to modifications and improvements on the process of the above identified application and has among its objects to simplify and cheapen the process of forming the urea and the phosphate and nitrogenic compositions; to produce fertilizers of varied characteristics and compositions; and to provide a process in which salts useful as fertilizing materials may be utilized for the conversion of free cyanamid, in solution, to urea.

With these and other objects in view, which will be apparent from the following description, the invention comprises the process described in the following specification and claims.

In our present invention, the raw cyanamid or lime nitrogen is transformed into a solution of free cyanamid by adding finely divided raw cyanamid in small portions to water which is constantly agitated and is continuously acidified with an acid forming insoluble compounds with the metallic constituents of the raw cyanamid. This solution of the raw cyanamid is carried on while the temperature of the water is maintained sufficiently low to avoid or prevent the polymerization of substantial quantities of the free cyanamid to dicyandiamid. For this purpose, cold water is used and is maintained at a low temperature, preferably below 40° C., through the dissipation of the heat set free in the neutralizing of the metals of the raw cyanamid, a cooling means being employed where necessary, particularly when a weak acid, such as carbonic acid, is used and when there is consequently a danger of the acidity falling very low at times. The solution of free cyanamid may be brought to any desired degree of concentration by removing the precipitated insoluble metallic salts and adding further quantities of raw cyanamid and acid to the clarified solution. The solution of free cyanamid thus obtained is then further acidified by the addition of acid salts, such as the acid sulphate or phosphate of the alkali metals and is then heated to a temperature sufficient to transform the free cyanamid to urea or salts of urea, a temperature of from 60° C. to 70° C. being suitable for this purpose. For the production of pure urea, the urea or salts of urea may be crystallized from the solution, leaving a mother liquor containing the acid urea solution and various nitrogenic conversion products. Or the acid solution of urea may be combined directly with phosphatic materials for the production of a mixed fertilizer to which may also be added mother liquors remaining from the crystallization of urea. As the urea solution and the mother liquors contain the acid constituents used for the conversion of the free cyanamid to urea, these solutions may be added directly to tricalcium phosphates such as phosphate rock, bone powder, or basic slag, and may serve to convert these insoluble phosphates to soluble acid phosphates.

In forming the solution of free cyanamid, any suitable acid may be used to neutralize and remove the metallic constituents combined with the cyanamid or present as impurities, but a gaseous acid capable of forming insoluble salts with the metallic constituents to be neutralized is preferred. For example, sulphur dioxide or carbon dioxide may be used, preference being given to that one which is more available. The gaseous acid is supplied continuously, the rate of supply of the raw cyanamid and acid being so proportioned as to precipitate the metallic constituents of the finely divided raw cyanamid as the successive portions of the raw cyanamid are added and to bring the resulting solution to a slight acidity. During the addition of the raw cyanamid, the solution is vigorously stirred or agitated in order to maintain the finely divided raw cyanamid in suspension and disseminated throughout the solution, to avoid the formation of lumps, and to rapidly distribute the dissolved gases throughout the solution and into intimate contact with the suspended particles.

During the addition of the raw cyanamid, excessive heating of the solution should be avoided in order to prevent the polymerization of the free cyanamid to dicyandiamid. Should the dissipation of the heat set free during the addition of the raw cyanamid not be sufficiently rapid, the solution may be cooled by any suitable means.

During the addition of the raw cyanamid, the insoluble metallic salts formed in the solution increase, eventually becoming great enough to interfere with the stirring and circulation of the liquid. To obtain a solution of a greater concentration of free cyanamid than is obtained when an excessive quantity of precipitated salts are formed, the precipitate may be removed from the solution by filtration or other equivalent means and the addition of finely divided raw cyanamid and gaseous acid and filtration of the liquid continued or repeated until a solution of the desired concentration is obtained. The removed precipitates are then washed with water to remove remaining traces of free cyanamid and the wash water is used for the extraction of a fresh batch of cyanamid. The resulting precipitated calcium carbonate may be used for various technical purposes.

The filtered solution of free cyanamid thus obtained is acidified with an acid salt or mixture of acid salts, and is then heated to a temperature of from 60° C. to 70° C. and maintained at this temperature for about one half hour to transform the free cyanamid into urea by hydration with the water of the solution, the acid serving to catalyze this reaction and then unites with the urea to acid solution of urea. Any suitable acid salt may be employed, such as an acid phosphate or acid sulphate. An acid alkali sulphate, such as potassium hydrogen sulphate is preferred as the requisite quantity of potassium to form a complete fertilizer may be thus supplied. As the free cyanamid is not appreciably polymerized in acid solution even at these higher temperatures, a solution of urea may be obtained without the formation of objectionable quantities of dicyandiamid.

The urea thus formed may be crystallized from the solution and purified for technical uses or used as a fertilizer, or the solution may be concentrated and mixed directly with a phosphate and evaporated to form a complete fertilizer. When the urea is crystallized and thus removed from the solution, the mother liquors contain a quantity of nitrogenic conversion products in addition to urea remaining in solution and the acid constituents. This mother liquor may therefore be added to phosphatic materials, thus increasing or adding nitrogenic fertilizing constituents. Inasmuch as the acid salts added for the conversion of the free cyanamid to urea remain unchanged in the resulting solution except as the acid radical is weakly combined with the urea, and thus readily available for acidifying tricalcium phosphate, this acidity may be efficiently used for the conversion of insoluble phosphates, such as phosphate rock, bone powder, or basic slag, to soluble phosphates readily applicable as fertilizers. There is thus formed, in addition to the potassium sulphate and nitrogenic material, a quantity of soluble phosphates and of calcium sulphate. The solution may then be evaporated sufficiently to permit the water to be taken up by the crystallization of the calcium sulphate to form a solid mass containing the calcium sulphate in a form similar to plaster of Paris and suitable for a complete or mixed fertilizer.

Since the acid sulphates are used primarily as catalyzers in forming the urea, they may be added in greater or less quantities depending on the required speed of conversion and may be so proportioned as to convert the quantity of phosphate desired in the final fertilizer composition. The acid content of the salts is thus used not only to convert the cyanamid to urea but also serves for the conversion of insoluble phosphates to soluble phosphates. The raw cyanamid is therefore cheaply converted to a readily usable and assimilable form either alone or as a constituent of a complete, mixed, fertilizer.

As changes of manipulation could be made within the scope of our invention, it is desired that all matter contained in the above description shall be interpreted as illustrative and not in a limiting sense.

Having described our invention, what we claim and desire to secure by Letters Patent is:

1. A process of the type described which comprises, adding finely divided raw cyanamid in small successive portions to water acidified with an acid forming insoluble compounds with metallic constituents of said raw cyanamid, the water being agitated during said addition, removing the insoluble salts from the solution of free cyanamid thus formed, then acidifying said solution with an acid sulphate and heating it to a temperature of approximately 60° C. to 70° C. to hydrate the free cyanamid in solution to urea.

2. A process of the type described which comprises, adding finely divided raw cyanamid in successive small portions to water acidified with carbonic acid to form a solution of free cyanamid, agitating said solution durng the addition of said raw cyanamid, removing the insoluble salts thus formed, acidifying the solution with an acid sulphate and heating it to approximately 60° C. to 70° C. to transform the free cyanamid in solution to urea.

3. A process of the type described which comprises, adding finely divided raw cyanamid in successive small portions to water acidified with carbonic acid to form a solution of free cyanamid, said water being agitated during the addition of said raw cyanamid, removing the insoluble salts from the resulting solution of free cyanamid, acidifying said solution of free cyanamid with potassium acid sulphate and heating it to approximately 60° C. to 70° C. to transform the free cyanamid in solution to urea.

4. A process of producing fertilizers which comprises, adding finely divided raw cyanamid in successive small portions to water acidified with carbonic acid to form a solution of free cyanamid while maintaining said solution at a temperature below 40° C., removing the insoluble salts formed, then acidifying said solution of free cyanamid with sodium acid sulphate and heating it to approximately 60° C. to 70° C. to transform the free cyanamid in solution to urea.

5. A process of producing fertilizers which comprises, adding finely divided raw cyanamid in successive small portions to water acidified with carbonic acid to form a solution of free cyanamid while agitating said solution, removing the insoluble salts thus formed from the solution, acidifying the solution with an acid sulphate and heating it to approximately 60° C. to 70° C. to transform the free cyanamid therein to urea and treating a calcium phosphate with the resulting acid solution to form a nitrogenic and phosphatic fertilizer.

6. A process of producing fertilizers which comprises, adding finely divided raw cyanamid in successive small portions to water acidified with carbonic acid to form a solution of free cyanamid, agitating said solution and mantaining it at a temperature below 40° C. during the addition of said raw cyanamid, removing the insoluble salts formed from said solution, acidifying said solution of free cyanamid with potassium acid sulphate and heating it to approximately 60° C. to 70° C. to transform the free cyanamid in solution to urea and treating calcium phosphate with the resulting acid solution to form a complete fertilizer.

7. A process of producing fertilizers which comprises, adding finely divided raw cyanamid in successive small portions to water to which carbon dioxide is supplied in quantity to precipitate the metallic constituents of the raw cyanamid and to form a slightly acid solution, agitating said solution during the addition of said raw cyanamid, filtering the precipitate from the resulting solution of free cyanamid, adding an acid sulphate to the resulting solution and heating the acidified solution to approximately 60° C. to 70° C. to transform the free cyanamid to urea.

8. A process of producing fertilizers which comprises, adding finely divided raw cyanamid in successive small portions to water to which carbon dioxide is supplied in quantity to precipitate the metallic constituents of the raw cyanamid and form a slightly acid solution of free cyanamid, while maintaining said water below 40° C., adding potassium acid sulphate to the resulting solution of free cyanamid, heating the resulting acid solution to approximately 60° C. to 70° C. to transform said free cyanamid to urea and treating calcium phosphate with the resulting solution to form a complete fertilizer.

In testimony whereof we affix our signatures.

JOSEPH BRESLAUER.
GEORGES DARIER.